July 30, 1946.   J. SIVERTSEN   2,404,868
PRESSURE RESPONSIVE CONTROLLING MECHANISM
Filed March 31, 1943   4 Sheets-Sheet 2
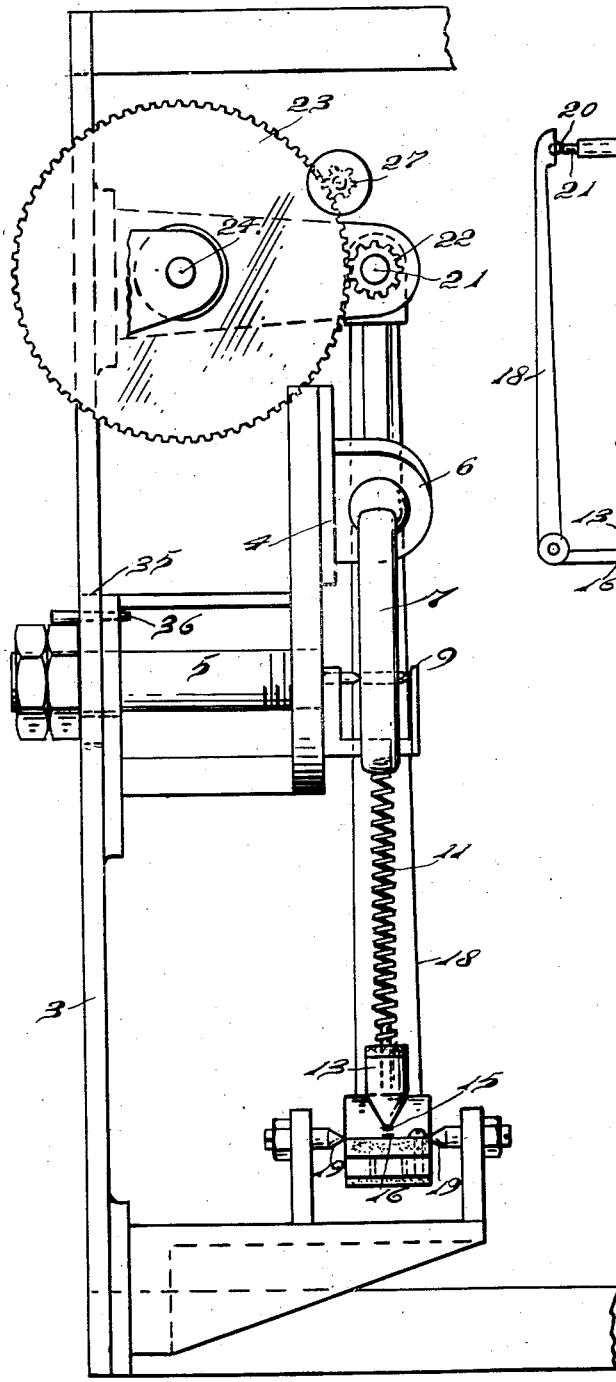
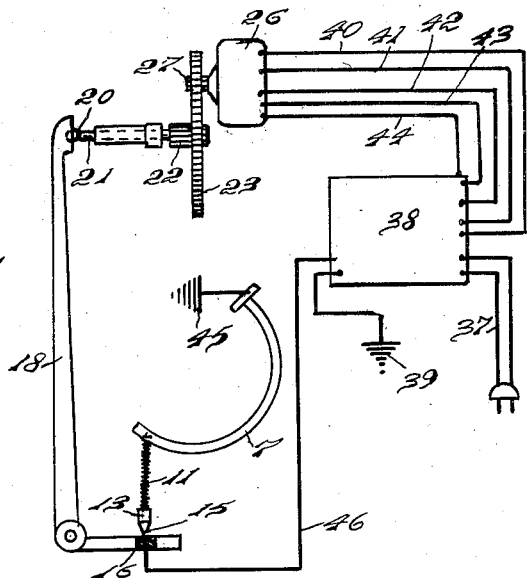
INVENTOR.
Jens Sivertsen
BY
T. Herbert Fairbanks
ATTORNEY.

Patented July 30, 1946

2,404,868

UNITED STATES PATENT OFFICE 2,404,868

PRESSURE RESPONSIVE CONTROLLING MECHANISM

Jens Sivertsen, Philadelphia, Pa., assignor to Tinius Olsen Testing Machine Company, Philadelphia, Pa., a corporation of Pennsylvania Application March 31, 1943, Serial No. 481,188

7 Claims. (Cl. 200—81.8)

In some types of testing machines, the load is applied by hydraulic pressure, and the load is measured by an hydraulic gauge provided with a pinion, gear segment and pointers.

It is desirable to plot this load versus the strain on the specimen on graph paper to thereby obtain the stress-strain characteristic of the material. Several methods have heretofore been used which employed an hydraulic spring or Bourdon tube.

The object of this invention is to devise novel pressure responsive controlling mechanism. With the foregoing and other objects in view as will hereinafter clearly appear, my invention comprehends novel pressure responsive controlling mechanism.

Other novel features of construction and advantage will appear in the detailed description and the appended claims.

For the purpose of illustrating the invention, I have shown in the accompanying drawings typical embodiments of the invention, which, in practice, will give satisfactory and reliable results. It is, however, to be understood that these embodiments are typical only, and that the various instrumentalities of which the invention consists can be variously arranged and organized, and that the invention is not to be limited to the exact arrangement and organization of these instrumentalities as herein shown.

Figure 2 is a side elevation of a portion of the recorder.

Figure 3 is a wiring diagram.

Similar numerals of reference indicate corresponding parts.

Figures 1, 7:
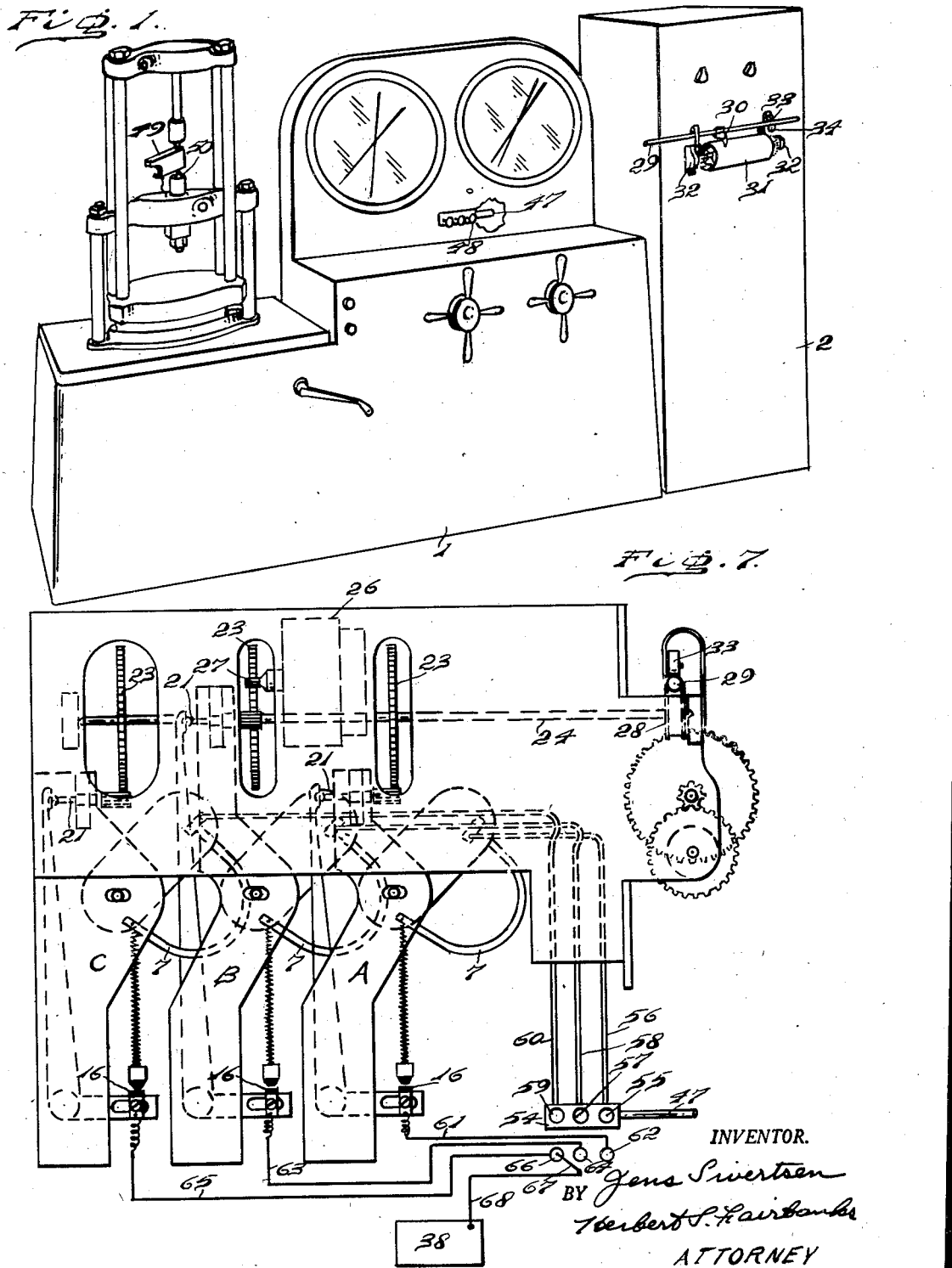
Figure 1 is a perspective view of a conventional testing machine having in conjunction therewith a recorder.
Figure 7 is rear elevation, showing more particularly a plurality of Bourdon tubes connected with a drive shaft.

Referring to the drawings:

1 designates an hydraulic testing machine of any desired or conventional construction in conjunction with which a recorder is shown. The recorder is mounted in an enclosing casing or cabinet 2, having within it a frame 3 on which the moving parts are mounted.

Figure 4:
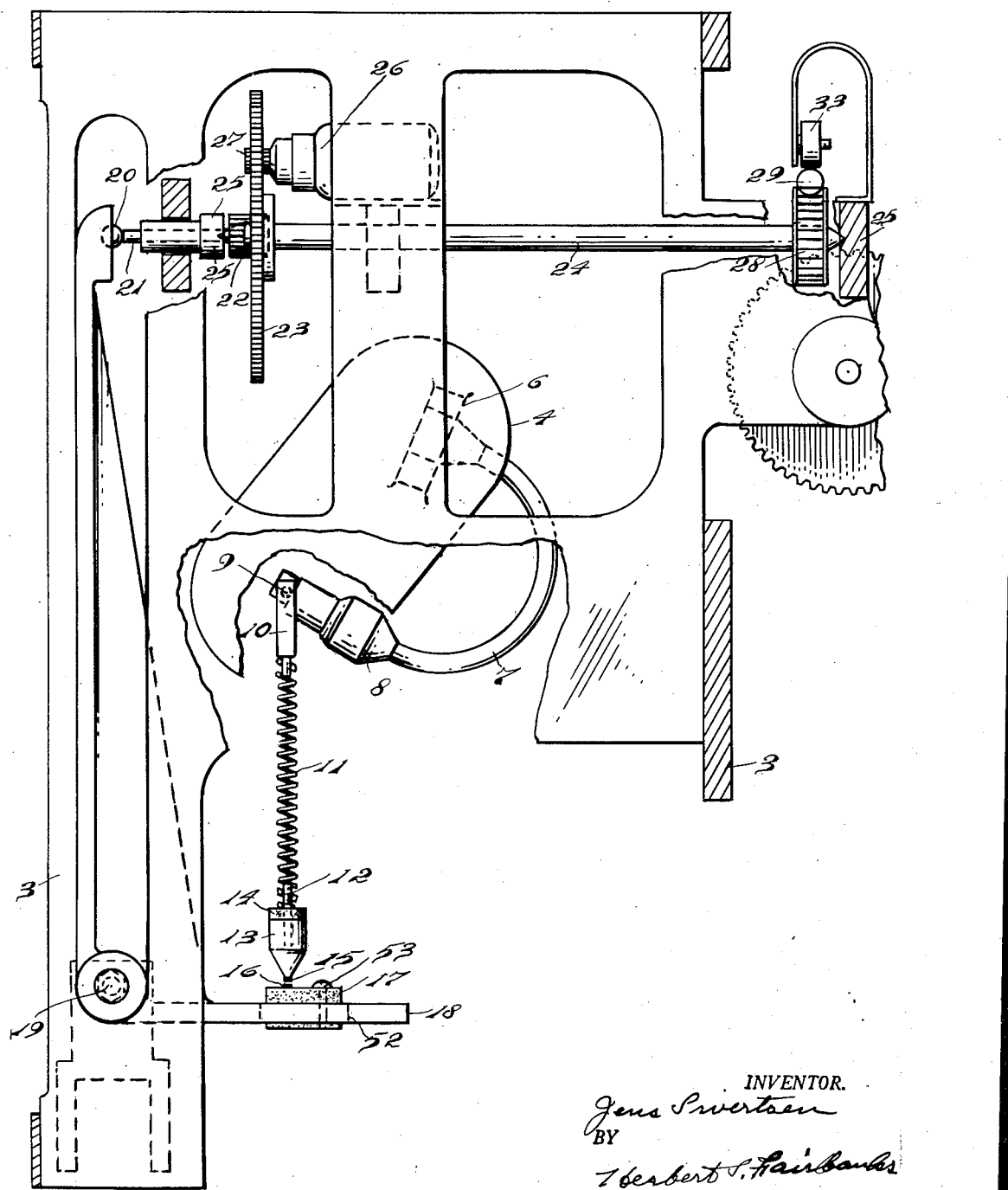
Figure 4 is a sectional elevation, viewed from the rear.

Referring now more particularly to Figures 2 and 4, a bracket 4 is adjustably fixed to the frame by a bolt 5 and is provided with a socket 6 adapted to receive one end of an hydraulic spring or Bourdon tube 7. The free end of the tube is closed by a tip 8, having pivots 9 on which a yoke 10 is mounted. A coil spring 11 has one end connected with the yoke and its opposite end is connected to a screw 12 adjustable in a weight 13 and locked in its adjusted position by a nut 14. The weight 13 has a contact 15 which cooperates with a contact 16 on an insulating block 17, mounted on the lower arm of a bell-crank lever 18, fulcrumed at 19 on the frame.

The upper arm of the bell-crank lever has a ball 20 inserted in it and bearing against one end of a micrometer screw 21. The micrometer screw is suitably mounted in the frame and has a pinion 22, meshing with a gear 23 fixed to a shaft 24, journalled in bearings 25 on the frame. A reversible motor 26 mounted on the frame has its shaft provided with a gear 27 meshing with the gear 23 to drive it, and thereby the shaft 24. The shaft 24 has a pinion 28 fixed to it, and this pinion meshes with a rack 29 which carries a marking pen 30, cooperating with a chart-carrying drum 31, see Figure 1, mounted in bearings 32. A roll 33 rests on the rack to hold it in its proper position, and two of these rolls are employed. The rack at its forward portion has a slot in its bottom into which a guide roll 34 extends.

The recording chart drum is revolved in the manner well known in the art by a motor and connecting gearing and controlled by an extensometer attached to the specimen being tested in a similar manner to that shown in my prior patent for extension recorders, No. 2,180,175, November 14, 1939.

The bolt 5 is arranged coaxially with the pivots 9 so that the straight line movement of the tip of the tube can be arranged to be vertical and the weight 13 and contact 15 will move in a vertical direction. The frame has a slot 35 to provide for the adjustment of the bolt 5. After the adjustment has been made, the parts are fixed in position by one or more pins 36, see Figure 2.

Referring now to Figure 3, the Bourdon tube is grounded at 45. The conductors 37, connectible with a source of electric supply, are connected with a control box 38, grounded at 39, which has five lines 40, 41, 42, 43 and 44 to the reversible motor 26 to effect the revolution of such motor in a forward or a reverse direction.

The contact 16 is connected by a line 46 with the control box. The relay for the motor is preferably mounted in the control box, as will be understood by those skilled in the art.

The fixed end of the Bourdon tube is connected by a pipe 47, see Figure 1, with the pressure system of the testing machine and controlled by a valve 48. The connection may be with the loading cylinder of the testing machine, or at any suitable point in the pressure system.

Figure 5:
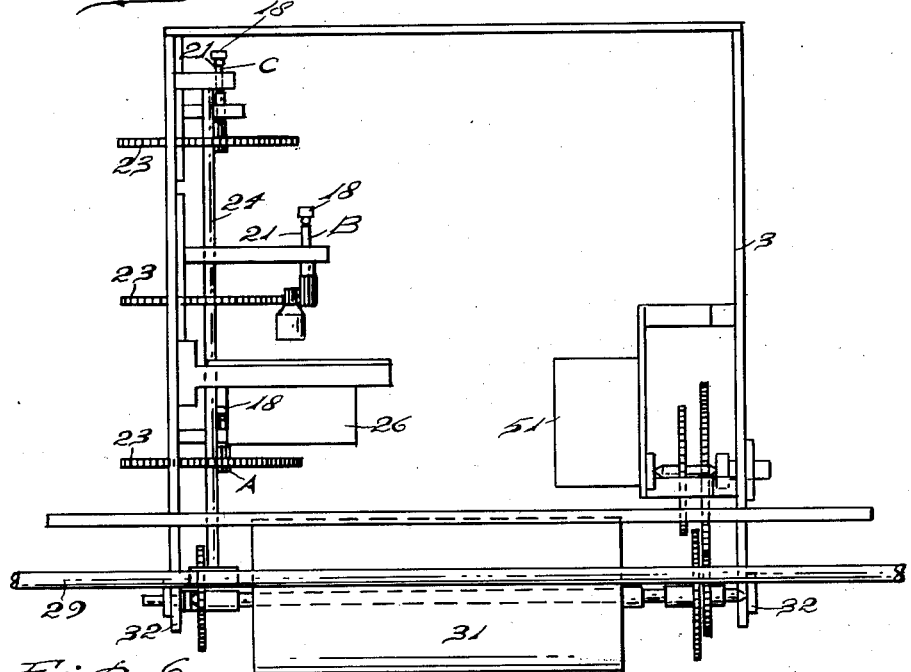
Figure 5 is a top plan view of another embodiment of the invention, showing a plurality of Bourdon tubes and their adjuncts.
Figure 6:
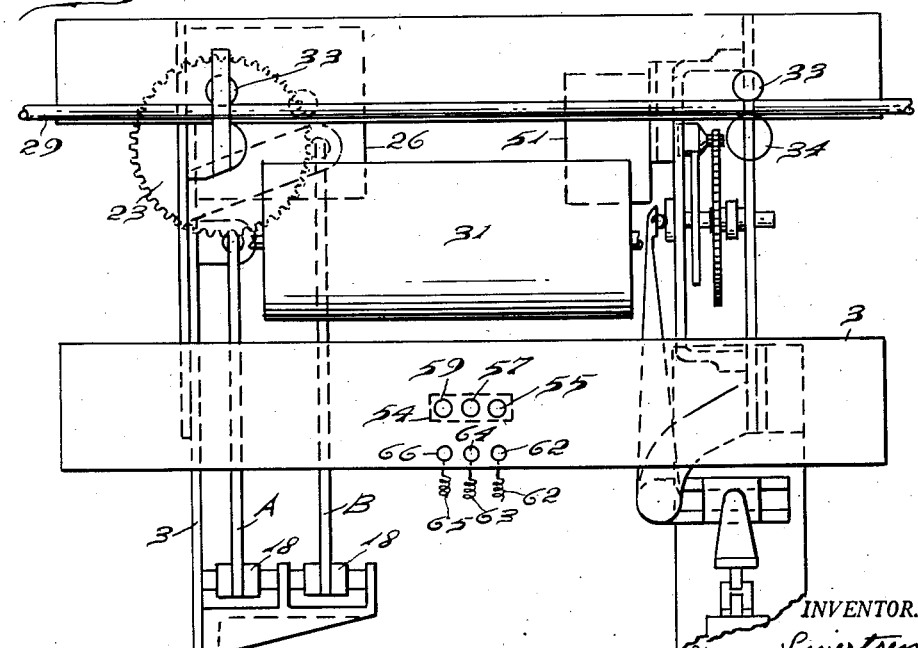
Figure 6 is a front elevation of Figure 5.

An extensometer 49, attached to the specimen under test 50 controls a motor 51, see Figures 5 and 6, intergeared with the shaft of the chart drum 31 to revolve it, and is controlled as disclosed in my prior Patents No. 2,176,016, of October 10, 1939, and 2,180,175, November 14, 1939. For this reason and because the chart drum can be driven in any conventional or desired manner known in the art, a detailed description of such construction and operation is believed to be unnecessary.

The insulating block 17 which carries the contact 16 is adjustable longitudinally in a slot 52 in the lower arm of the lever 18, and is fixed in the position to which it is adjusted by a fastening device 53. Since the bracket 4 is also adjustable, it will be apparent that the proper vertical alignment of the contacts 15 and 16 and the straight line vertical movement of the weight 13 can be obtained.

The operation is as follows:

The hydraulic pressure transmitted from the pressure system of the testing machine to the Bourdon tube 7 causes the tip travel of the tube to be in a downward direction. The circuit to the control box is closed by contact 15 engaging the contact 16, and the motor revolves. When the contact is made, the relay is energized in the control box and the motor will run and effect the opening of the contact. When the contact opens the motor will run to effect the closing of the contact.

The lever 18 is constructed and mounted so that its upper end bears against the outer end of the micrometer screw 21. The motor 26 is intergeared with the shaft 24, which latter causes the pinion 28 to revolve, thus advancing the marking pen 30 which cooperates with the chart on the chart drum. Since the micrometer screw is threaded in its bearing and intergeared with the gear 23, it will move forwardly, permitting the lever 18 to rock on its fulcrum. The contact breaks, and the motor runs to close the contact.

In some cases it has been found desirable to have more than one range of pressure, so that a selective range of a plurality of ranges may be employed. This is shown in Figures 5, 6 and 7.

For the sake of illustration, I have shown three Bourdon tube assemblies, A, B, and C for controlling the shaft 24, each of the Bourdon tubes being adapted for a different pressure range. Since these assemblies each operate in the same manner to drive their respective micrometer screw 21, intergeared with gears 23 on the shaft 24, a detailed description of each tube assembly is not necessary as it will be clearly understood from the description already given with Figures 1-4, inclusive.

In this embodiment of the invention, the pressure from the pressure system of the testing machine passes by pipe 47 to a valve box 54 having a valve 55 controlling introduction of pressure by a pipe 56 to the Bourdon tube 7 of assembly A. A valve 57 controls the pressure passing by pipe 58 to the Bourdon tube 7 of assembly B. A valve 59 controls the pressure passing by pipe 60 to the Bourdon tube 7 of assembly C.

The contact 16 of assembly A is connected by line 61 with a stationary post 62 of a switch; the contact 16 of assembly B is connected by a line 63 with a contact post 64; and contact 16 of assembly C is connected by a line 65 with a post 66. The circuit controlling arm 67 of the switch is connected by a line 68 with the control box 38. It will thus be clear that the Bourdon tube assemblies A, B, and C can be selectively employed in accordance with the range of pressure desired, and the selected assembly will operate in the same manner as that already described in connection with Figures 1-4, inclusive.

It will be apparent that due to the manner in which the contacts are yieldingly carried by the Bourdon tubes, that, when a Bourdon tube indicative of a selected range of pressure is employed, there will be no interference with or injury to the other Bourdon tube assemblies.

It will further be apparent that all of the Bourdon tube assemblies can be used consecutively in the same test by actuating the proper switches and valves, and the stress-strain curves for all of the ranges for which the recorder is built will be indicated on the same chart. This is sometimes an advantage since the curves for the lower ranges of pressure will each be separately indicated, and can, therefore, be more accurately analyzed.

In accordance with this invention, a multitude of Bourdon tubes can be employed having a common indicating and recording means, with each of the Bourdon tubes having a different capacity to provide different ranges.

Each range has the same recording length, and has the same zero or starting point.

The arrangement is such that a change of range can be effected during a test without disturbing the test.

Having thus described my invention, what I claim as new and desire to secure by Letters Patent is:

1. Controlling mechanism, comprising a Bourdon tube subjected to internal pressure and having its intake end fixedly supported, a vertically disposed, yieldable member having its upper end movably mounted on the tip of the tube, a weight at the lower end of said member, a micrometer screw adapted to be moved forwardly and rearwardly, a lever having an arm bearing at all times against an end of said screw, and having another arm extending in proximity to said weight, and cooperating contacts on said weight and said latter arm, the tip travel of the tube permitting the weight contact to engage the arm contact, and the movement of the screw in one direction causing the lever to effect the opening of the contacts.

2. The construction specified in claim 1, wherein the movement of the screw in the opposite direction causes said lever to effect the closing of the contacts.

3. Controlling mechanism, comprising a Bourdon tube mounted to have its tip travel vertically disposed, a spring connected at its upper end with said tip, a weight suspended by the lower end of said spring, a micrometer screw adapted to be moved forwardly or rearwardly, a bellcrank lever having an arm at all times bearing against an end of said screw and having an arm extending beneath said weight, and cooperating contacts on said latter arm and weight.

4. Controlling mechanism, comprising a Bourdon tube mounted to have its tip travel in a vertical direction, a contact suspended from the tip of the tube, and moved vertically by change of pressure in the Bourdon tube, a micrometer screw adapted to be moved forwardly or rearwardly, a bellcrank lever having an arm disconnected from but movable with said screw and having an arm extending laterally beneath said suspended contact, a contact carried by said latter arm to cooperate with said suspended contact.

5. Controlling mechanism, comprising a plurality of Bourdon tube assemblies to provide a selective range of a plurality of ranges of pressure, each tube having different capacities to provide different ranges with each range having the same recording length and the same starting point, a micrometer screw for each assembly each assembly having a set of cooperating contacts, one contact of each set being resiliently suspended from the tip of its tube, in a vertical direction on change of pressure in the Bourdon tube each assembly having a lever bearing against its screw in the direction of its movement, a contact on the lever cooperating with the suspended contact of its set, whereby the sets of contacts of the assemblies are consecutively closed.

6. Controlling mechanism, comprising a micrometer screw continuously driven to revolve in a forward or a reverse direction, a Bourdon tube, a spring connected with the tip of said tube, a weight at the lower end of said spring, a contact carried by said weight, a bellcrank lever contacting at all times an end of said screw, and having a laterally extending arm, and a contact on said arm in the vertical plane of said spring.

7. Controlling mechanism, comprising a Bourdon tube mounted to have a vertical tip travel, a spring connected at its upper end with said tube, a contact carried at the lower end of said spring, a continuously driven micrometer screw having a reversible drive, a bellcrank lever having an upwardly directed arm bearing at all times against an end of said screw and having an arm extending laterally beneath said contact, and a contact on said arm beneath said first contact whereby when said contacts engage due to increased pressure in said tube the micrometer screw is driven in a forward direction to permit the lever to turn to open the contacts and effect the movement of the screw in a reverse direction, thereby turning said lever to cause a reengagement of said contacts.

JENS SIVERTSEN.